A. LATTAU.
AUTOMATIC PHOTOGRAPHING APPARATUS.
APPLICATION FILED JUNE 2, 1910. RENEWED FEB. 28, 1918.
1,280,252.
Patented Oct. 1, 1918.
6 SHEETS—SHEET 1.
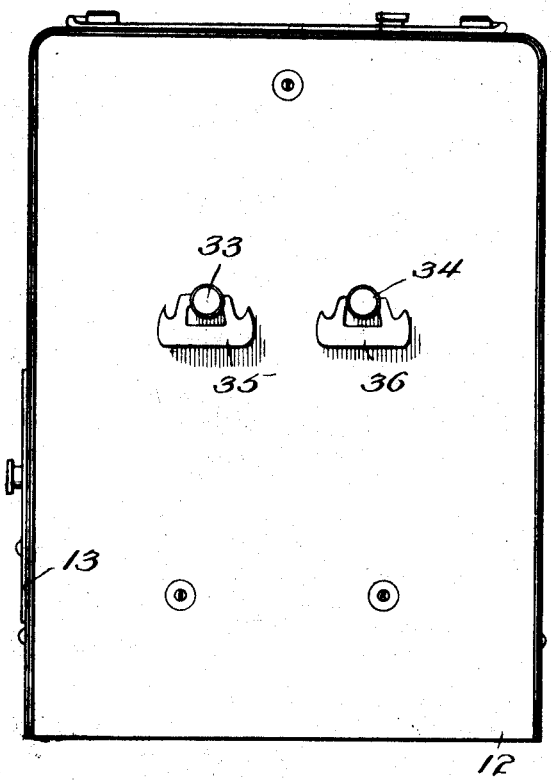
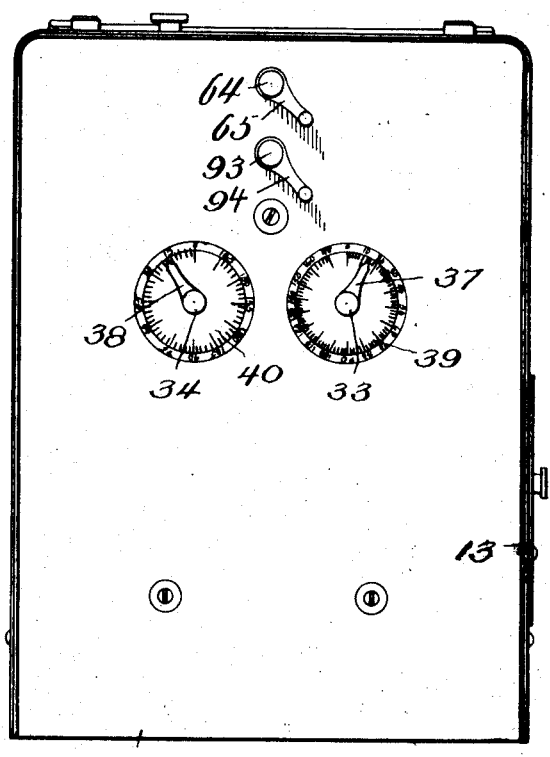
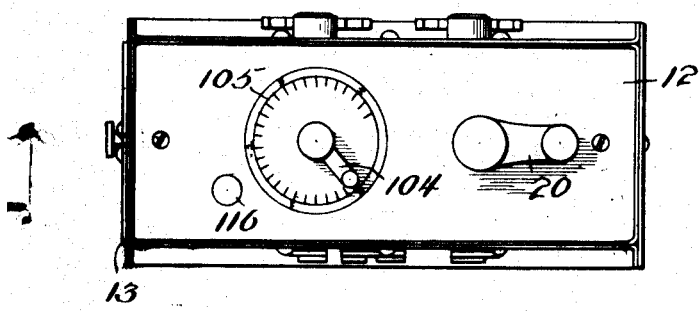
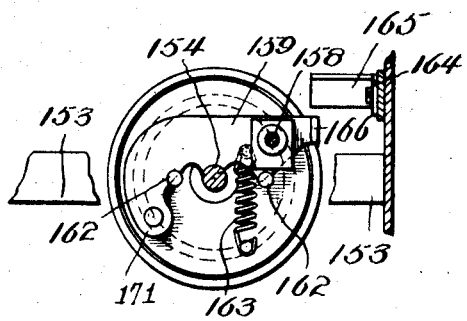
WITNESSES:
INVENTOR
Arthur Lattau
BY
Calvin Calvert
Attorneys

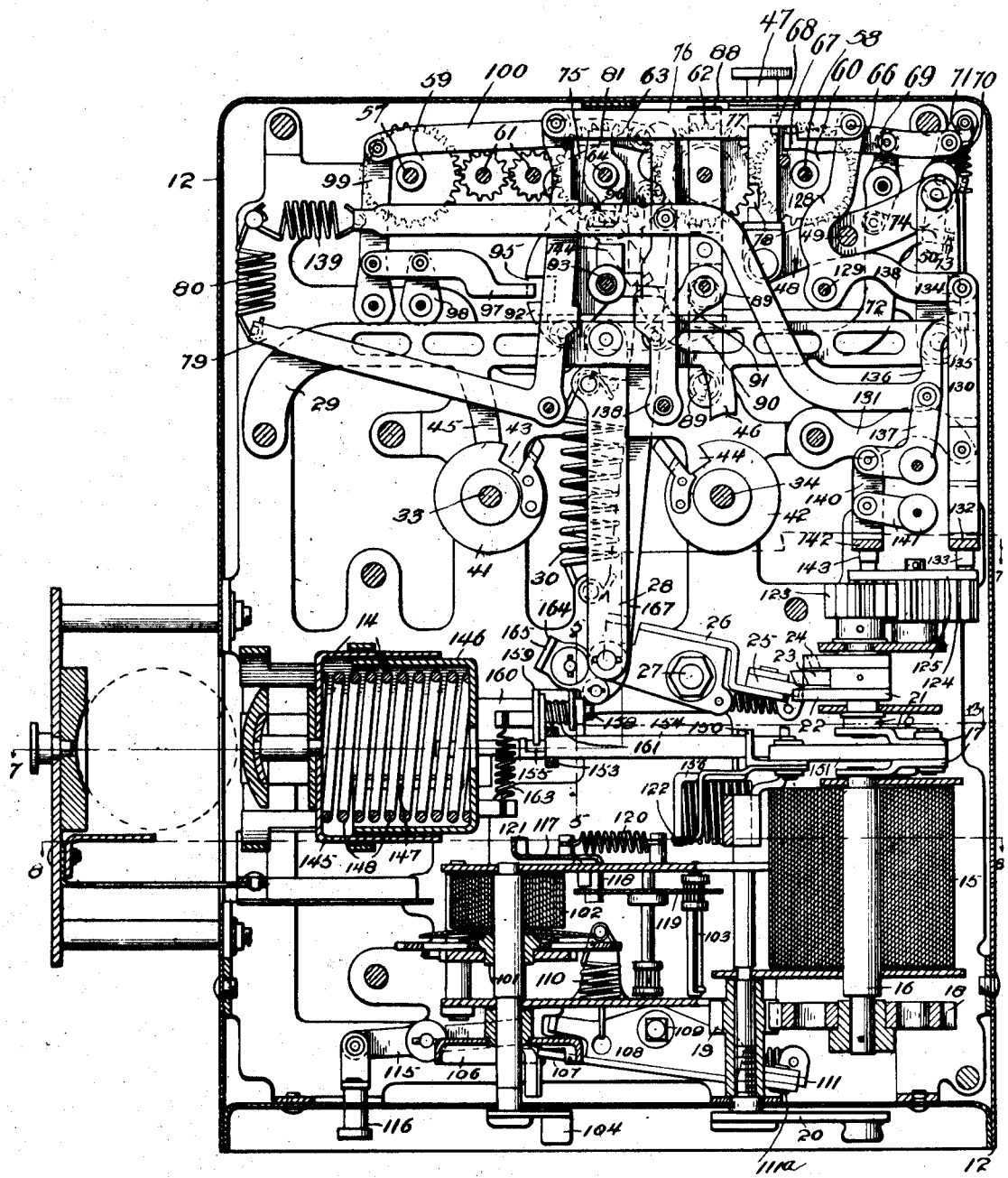

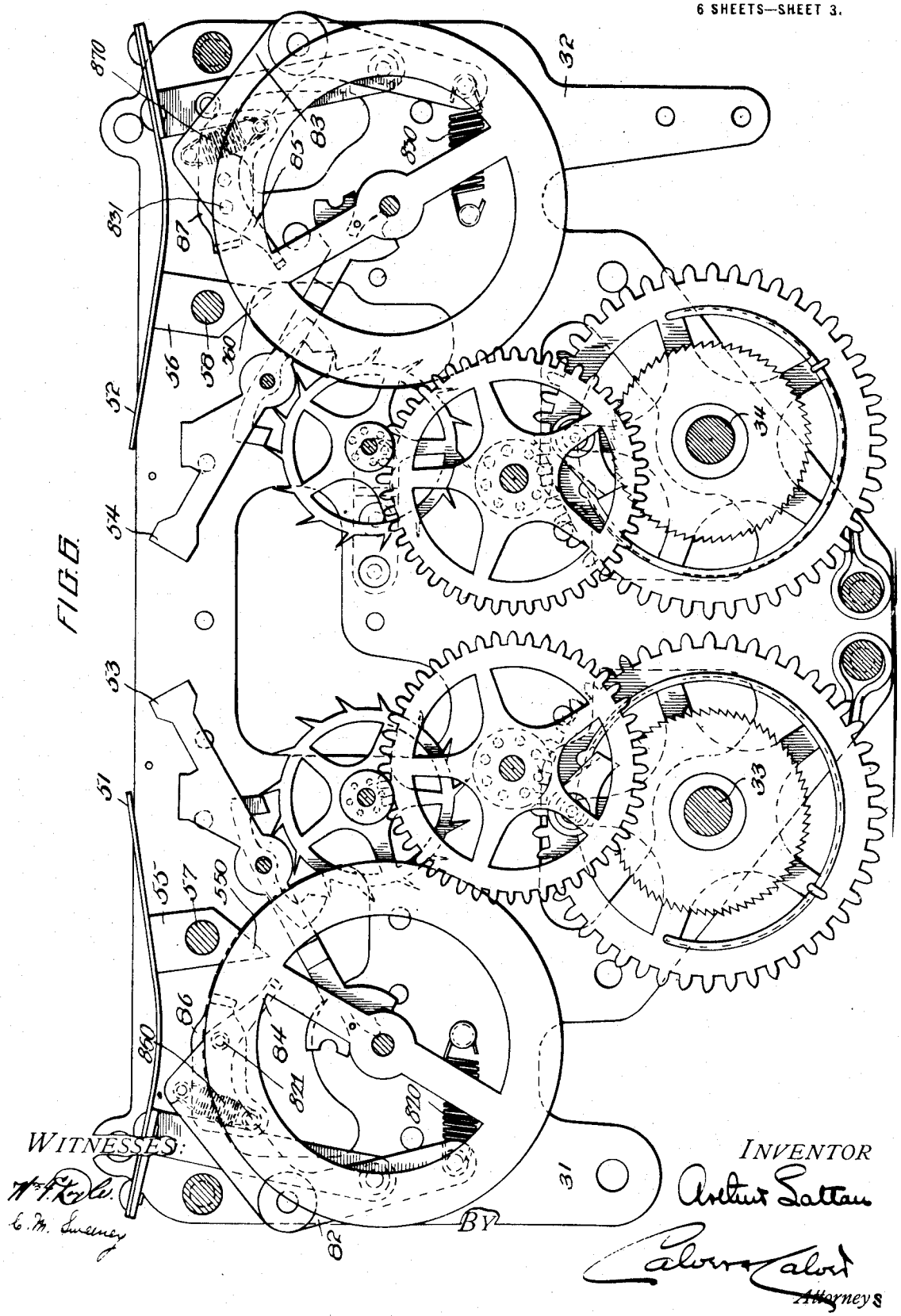

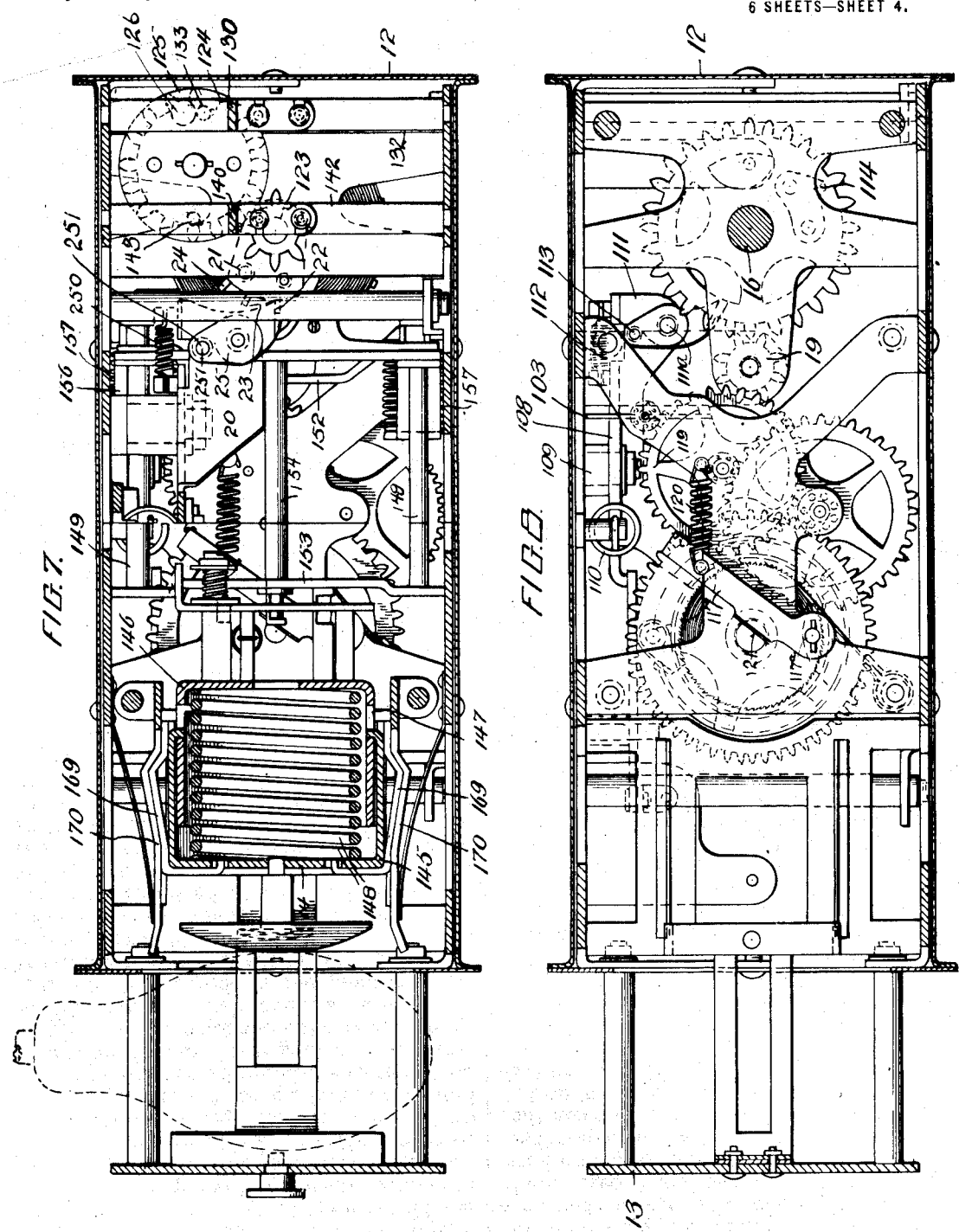

A. LATTAU.
AUTOMATIC PHOTOGRAPHING APPARATUS.
APPLICATION FILED JUNE 2, 1910. RENEWED FEB. 28, 1918.
1,280,252.
Patented Oct. 1, 1918.
6 SHEETS—SHEET 5.
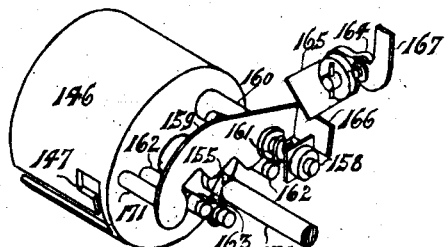
Fig. 12.
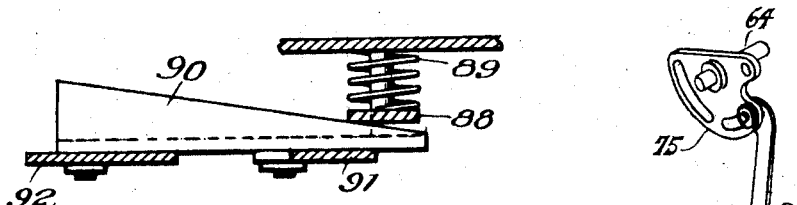
Fig. 10.
Fig. 11.
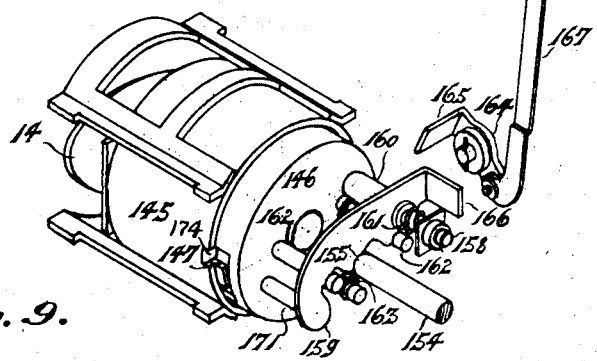
Fig. 9.
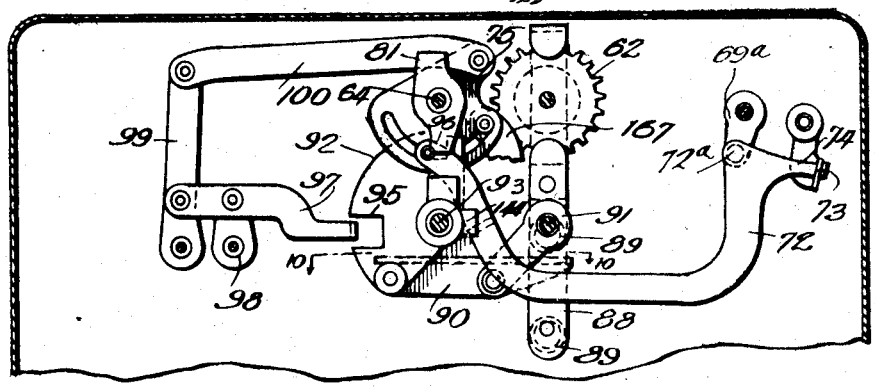
WITNESSES
M. E. Rathvon
S. J. Henderson
INVENTOR
Arthur Lattau
By Calvin Calvert
Attorneys

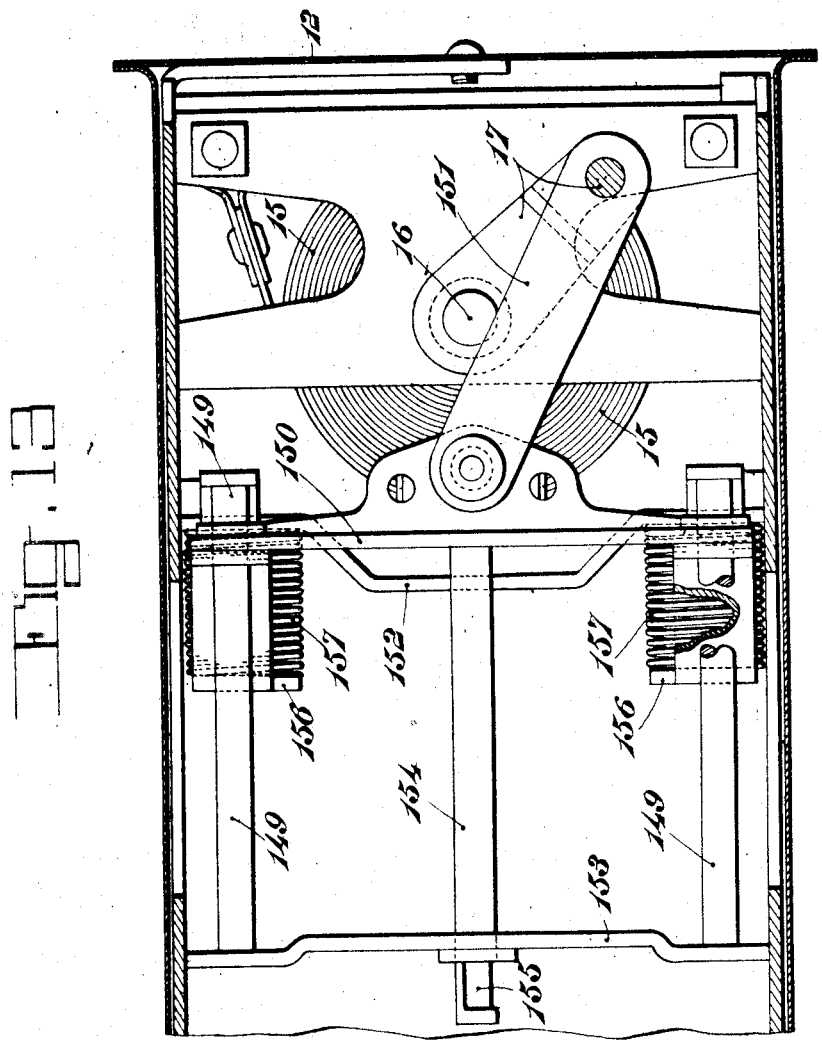

UNITED STATES PATENT OFFICE.

ARTHUR LATTAU, OF NEW YORK, N. Y.

AUTOMATIC PHOTOGRAPHING APPARATUS.

1,280,252.  Specification of Letters Patent.  Patented Oct. 1, 1918.

Application filed June 2, 1910, Serial No. 564,693.  Renewed February 28, 1918.  Serial No. 219,732.

*To all whom it may concern:*

Be it known that I, ARTHUR LATTAU, a citizen of the United States, residing at New York, in the county of New York and State of New York, have invented or discovered certain new and useful Improvements in Automatic Photographing Apparatus, of which the following is a specification, reference being had therein to the accompanying drawings.

This invention relates to apparatus or devices for automatically operating the shutter of a photographic camera for the purpose of exposing a plate or film therein in a predetermined manner and at a predetermined time in the absence of the operator. As herein shown the invention is applied to a device of the general character shown and described in Letters Patent Nos. 1,092,273 and 1,135,032, granted to me April 7, 1914, and April 13, 1915, respectively.

Camera shutters as now constructed are of a variety of types and are each usually capable of producing exposures of different kinds by suitable adjustments or manipulations causing different operations of the shutter mechanism. Such shutters are usually operated by a pressure on the end of a flexible power transmitter. An "instantaneous exposure" is made after proper adjustment, by a single pressure on said end. An ordinary time exposure, hereinafter referred to as a "time exposure" is produced by pressing said end twice, once to open the shutter and a second time to close the same. By another arrangement of mechanism there is produced what, for convenience, I will designate an "automatic time exposure" which is produced by a single pressure on the end of said flexible power transmitter, as in the case of an instantaneous exposure, this operation serving to open the shutter which is automatically closed after a predetermined time by mechanism associated with the shutter itself. A third form of time exposure, usually of comparatively short duration, hereinafter referred to as a "bulb exposure" is produced by pressing the end of said flexible power transmitter to open the shutter, maintaining said pressure during the period of exposure, and thereafter discontinuing the same to cause the shutter to close.

In my prior Patent No. 1,092,273, above referred to, mechanism is disclosed which is adapted to produce an "instantaneous" or an "automatic time exposure", while in my above mentioned Patent No. 1,133,032, the mechanism described and shown is adapted for "time exposures".

It is one of the objects of the present invention to provide a device of the character referred to which is capable, upon suitable adjustment, of producing any one of the exposures above described.

Further objects of the invention are to provide certain improvements in such apparatus whereby the same is rendered more convenient in use, and whereby the necessary setting and adjustment of the apparatus is facilitated and the operation thereof rendered more accurate and certain.

These and other objects of the invention, together with means whereby the same may be carried into effect, will best be understood by the following description of one form or embodiment thereof illustrated in the accompanying drawings. It is to be understood, however, that the construction, shown and described has been chosen for illustrative purposes merely, and that many changes may be made therein without departing from the spirit and scope of the invention.

In said drawings—

Figures 1 and 2 are exterior elevations of the apparatus taken from opposite sides;

Fig. 3 is a bottom plan view thereof;

Fig. 4 is a substantially central vertical section;

Fig. 5 is a detail sectional view taken substantially on the line 5—5, Fig. 4;

Fig. 6 is an elevation of the clockwork;

Fig. 7 is a horizontal section taken substantially on the line 7—7, Fig. 4;

Fig. 8 is a horizontal section taken substantially on the line 8—8, Fig. 4;

Fig. 9 is a fragmentary sectional view similar to Fig. 4 but with certain parts shown in Fig. 4 omitted to show more clearly the parts hidden thereby; and Fig. 10 is a detail sectional view taken substantially on the line 10—10, Fig. 9.

Fig. 11 is a detail perspective view of the plunger and the mechanism for detaching the same from its actuator, this view showing the parts connected.

Fig. 12 is a view of a part of Fig. 11 showing the plunger detached.

Fig. 13 is a fragmentary sectional view on the line 13, Fig. 4.

The mechanism as a whole is mounted in a suitable frame contained within a casing 12 provided with a suitable receptacle, preferably a drawer 13, for the reception of the shutter bulb, said mechanism comprising, in general, a shutter operating mechanism and suitable time-controlling mechanisms for controlling the operation of the shutter operating mechanism.

The shutter operating mechanism comprises a shutter actuating or operating device, preferably a plunger 14, adapted to exert a pressure on the end of a flexible power transmitter which is shown as a rubber tube terminating in a bulb actuating mechanism and connections for operating the same, and means for restraining the actuating mechanism until a predetermined time.

The actuating mechanism preferably comprises a flat helical or clock spring 15 adapted to turn a shaft 16 mounted in fixed bearings and provided with a crank 17 connected as hereinafter described with the plunger 14 for reciprocating the same. For the purpose of rewinding the spring 15 the shaft 16 is provided at its lower end with a gear 18 meshing with a pinion 19 adapted to be turned by a suitable crank or handle 20 at the bottom of the casing.

The means for restraining the above actuating mechanism until the predetermined time of exposure preferably comprises the following instrumentalities. Mounted on the shaft 16 is a ratchet 21 provided with three teeth 22, 23, and 24 arranged in different planes. Adapted to engage these teeth is a spring-pressed pawl 25 carried by a lever 26 fulcrumed at 27 and connected by a link 28 with a lever 29 actuated by a spring 30. The pawl 25 is normally held in the position shown by a spring 250 and stop pin 251.

One of the time controlling mechanisms for the apparatus, herein designated as the primary time controlling mechanism, comprises a plurality of clockworks, herein two, generically indicated by the numerals 31 and 32, provided with winding posts 33 and 34 extended at both ends to the exterior of the casing where they are provided at one side with keys 35 and 36 and at the other with indicators 37 and 38 coöperating with dials 39 and 40. Mounted on the winding posts 33 and 34 are cams 41 and 42 formed with notches 43 and 44 arranged respectively for the reception of noses 45 and 46 carried by the lever 29.

The operation of the mechanism thus far described for the purpose of producing a time exposure is substantially as follows. The key 35 is turned to cause the indicator 37 to indicate upon the dial 39 the time after which the exposure is to take place. The key 36 is turned to cause the indicator 38 to indicate a time greater than that shown by the indicator 37 by the length of the desired exposure. Turning of the keys 35 and 36 also results in winding the mainsprings of the clockworks 31 and 32 and in turning the cams 41 and 42 to bring the notches 43 and 44 to a greater or less angular distance from the noses 45 and 46. The clockworks being now started the cams 41 and 42 will be slowly rotated until the notch 43 is brought opposite the nose 45, which, under the influence of the spring 30, will thereupon enter said notch, bringing the nose 46 into engagement with the cam 42 and causing the pawl 25 to be disengaged from the tooth 22 and brought into the plane of the tooth 23. The shaft 16 will thereupon rotate until stopped by the engagement of the tooth 23 with the pawl 25, causing a reciprocation of the plunger 14 and a compression and release of the bulb. After the predetermined period of exposure the notch 44 is brought opposite the nose 46, whereupon a further movement of the lever 29 takes place, disengaging the pawl 25 from the tooth 23, permitting another rotation of the shaft 16 until the tooth 24 is brought into engagement with the pawl 25, and causing a second reciprocation of the plunger 14 and a second compression of the bulb.

For resetting the lever 29 after the above operations there is provided a resetting rod 47 extended to the exterior of the casing and pivoted at its inner end to a lever 48 fulcrumed at 49 and connected by a link 50 with the end of said lever 29.

For holding the clockworks 31 and 32 inoperative and for releasing the same at the proper time the following mechanism is provided. Suitably secured to the clockwork frame are two spring stops 51 and 52 adapted respectively to engage and hold the vibrating pallet levers 53 and 54 of said clockworks. For disengaging these stops there are provided cams 55 and 56 (see Fig. 6) mounted on shafts 57 and 58 provided with gears 59 and 60 (see Fig. 4) connected, the one by gears 61, and the other by a gear 62, with a gear 63 mounted on a shaft 64 extended to the exterior of the casing and provided with an actuator or manually operated key 65 (see Fig. 2). Manipulation of the key 65 will result in a simultaneous application or removal of the stops 51 and 52.

Except for certain re-arrangements of parts, or the substitution of mechanical equivalents, as will be apparent from the drawings, or otherwise as herein pointed out, the parts thus far described may be substantially as shown and described in my Patent No. 1,135,032, above referred to, and no claim is made herein to any subject-matter common to this application and my said prior patent.

After the resetting of the lever 29 by the means above described the same may be held in its reset position by a partial turning of the winding post 33 and cam 41 in order to remove the notch 43 from beneath the nose 45. In order, however, to obviate the necessity of thus partly rewinding the clockwork to hold the parts in reset position, means are herein provided, other than the time-controlling mechanism, for locking the shutter-operating mechanism inoperative in reset position. Such means as herein shown comprise a locking bar 66 having an end 67 adapted to enter a notch 68 in the resetting rod 47 when the latter is depressed, said locking bar being guided in its movements by a radius arm 69 and a lever 70 connected with a stationary part of the frame by a spring 71, said spring being arranged normally to project the end 67 of the locking bar 66 into engagement with the notch 68 of the resetting rod 47. For removing the locking bar 66 there is provided a link 72 (see Fig. 9) pivoted at 72ª to an extension 69ª of the radius arm 69 and having a projection 73 adapted to engage the end 74 of said lever 70, said link being connected at its opposite end, preferably by a lost motion connection, with a segment plate 75 mounted on the shaft 64. This construction is such that when the shaft 64 is turned to lock the time controlling mechanism the locking bar 66 will be placed under the influence of the spring 71 to engage and lock the resetting rod 47 when the latter is depressed. Upon the release of the time controlling mechanism by turning the shaft 64 the link 72 will be caused to withdraw the locking bar 66.

In order to compel the operator to lock the clockwork prior to the resetting of the shutter operating mechanism, there is provided a locking bar 76 having a projection 77 adapted to enter a notch 78 in the resetting rod 47 when the latter is elevated, said locking bar being pivoted at its end to a lever 79 controlled by a spring 80. Upon the release of the shutter operating mechanism the resetting rod 47 will be elevated and will be locked in its elevated position by the locking bar 76. Mounted on the shaft 64 is a cam 81 having a projection adapted to engage the lever 79 and move the same against the influence of the spring 80 when the shaft 64 is turned to effect a locking of the time controlling mechanism.

The parts last described all are or may be substantially as shown and described in my application filed June 2, 1910, Serial No. 564,692 except for such modifications as may be necessary to adapt the same to the type of device herein shown, or for other purposes as will hereinafter appear.

Also as in my application last above referred to means are provided for positively starting the time-controlling mechanism upon the release thereof, said means comprising levers 82, 83 having fingers 84, 85 and normally held in the position shown in Fig. 6 by springs 820 and 830. Pivoted at 821 and 831, respectively, to the levers 82 and 83 are dogs 86, 87 normally held in positions shown in Fig. 6 by springs 860, 870 each connected at its opposite ends, respectively, to the corresponding dog and lever. The ends of the dogs 86, 87 project or extend into the paths of movement of projections 550 and 560 formed on the cams 55 and 56, respectively. The action of the levers 82 and 83 is similar and (except as hereinafter mentioned) simultaneous, and description of the operation of the lever 83 will suffice for both. When the cam 56 is rotated from right to left, in order to allow the stop 52 to engage the pallet lever 54, the projection 560 engages the dog 87 and lifts and passes the same without moving the lever 83. Upon the movement of the cam 56 from left to right, in order to raise the stop 52 and release the clockwork 32, the projection 560 again engages the dog 87, this time moving the lever 83 and causing its finger 85 to engage the pallet lever 54, giving the same an initial impetus, the projection 560 thereafter passing the dog 87 and allowing the lever 83 to resume its normal position under the influence of the spring 830. It will therefore be seen that the turning of the key 65 will result not only in a simultaneous release of both the clockworks but in a positive starting of the same.

For the purpose of adapting the apparatus to instantaneous, automatic time, or bulb exposures, means are herein provided whereby one of the clockworks above described, herein the clockwork 31, may be started without starting the other. As herein shown (see Figs. 4, 9 and 10) the gear 62 is adapted to be moved laterally into and out of engagement with the gears 60 and 63 by a laterally sliding fork 88 suitably guided in the frame and movable in one direction to cause the engagement of said gears by springs 89 and in the opposite direction by a wedge bar 90 guided by a radius arm 91, and connected at its end to a segment or locking plate 92 mounted on a shaft 93, said shaft being extended to the exterior of the casing and provided with an actuator or key 94 (Fig. 2). As will be seen movement of the key 94 will move the gear 62 out of engagement with the adjacent gears, thereby rendering inoperative the connection between the actuator 65 and the stop 52 so that movement of said actuator will result in starting the clockwork 31 only.

In order to prevent disarrangement of the mechanism for holding and releasing the clockwork, it is desirable that means be provided for preventing movement of the key 94 except when the time-controlling mechanism is locked. To this end the locking plate 92 is provided with a pair of notches 95 and 96 one of which is adapted to be engaged, in either position of the key 94, by a locking bar 97 guided by a radius arm 98 and pivoted to a lever 99 connected by a link 100 with the segment plate 75. When the shaft 64 is turned into the position shown in the drawings to release the time-controlling mechanism the locking bar 97 is in locking engagement with the plate 92 thereby preventing turning of the shaft 93. When the shaft 64 is turned to cause the time-controlling mechanism to be locked the link 100 and lever 99 will cause a withdrawal of the locking bar 97, thereby permitting an adjustment of the devices by the key 94.

As will now be apparent, after the starting of the clockwork 31, the clockwork 32 remaining inoperative, the plunger 14 will, after a predetermined time, controlled by a setting of the indicator 37, as above described, be given a single reciprocation to produce a single compression of the bulb, and the time-controlling mechanism thereafter stopped. This operation of the apparatus will produce an instantaneous or an automatic time exposure, depending upon the character or adjustment of the shutter. In order to enable the apparatus to produce a bulb exposure it is necessary that the movement of the plunger 14 be stopped after its actuation to exert a force on the end of the power transmitter, thereby maintaining this force, and thereafter be returned to substantially its original position to discontinue said force. To this end the following force maintaining mechanism is provided.

Suitably mounted in the frame of the apparatus is a secondary time controlling mechanism including a clockwork comprising a winding post 101 and a main spring 102 connected by suitable gearing with a fan or wind wheel 103 for retarding the movement of said clockwork. The winding post 101 is extended to the exterior of the casing and there provided with a combined winding key and indicator 104 coöperating with a dial 105. Movable with the winding post 101 is a cam 106 having preferably a flanged edge provided with a notch 107 for the reception of the end of a lever 108 fulcrumed at 109, and held in engagement with said cam by a spring 110. Upon the end of the lever 108 is pivoted at 111ᵃ a pawl 111 normally held in the position shown by a spring 112 and stop pin 113. The lever 108 and pawl 111 substantially correspond in construction, arrangement, and function to the lever 26 and pawl 25. The pawl 111 is adapted when the end of the lever 108 is moved out of the notch 107 and held in engagement with the periphery of the cam 106 to engage a ratchet tooth or lug 114 formed upon or secured to the gear 18. For so moving the lever 108 in order to set the same there is provided a lever 115 engaging at one end the end of the lever 108, and pivoted at its opposite end to a resetting rod 116 extended to the exterior of the casing. For holding the clockwork normally inoperative there is provided a lever 117 fulcrumed at 117ᵃ and normally held with its end 118 in engagement with the gear wheel 119 of the clockwork by a spring 120. The lever 117 has an upturned end 121 arranged in the path of movement of the finger 122 (see Fig. 4) movable with the plunger 14.

The operation of the mechanism thus far described for producing a bulb exposure is as follows: The primary time controlling mechanism being locked, the key 94 is turned to cause a disengagement of the gear 62. The key 35 is turned to cause the indicator 37 to indicate the time after which the exposure is to take place. The resetting rod 116 is operated to lift the end of the lever 108 out of the notch 107 and the key 104 is turned to indicate upon the dial 105 the desired length of the bulb exposure. The key 65 is then turned to release the primary time controlling mechanism. At the end of a predetermined time the pawl 25 will release the ratchet 21, as above described, and will be brought into position to reëngage said ratchet upon a substantially complete rotation of the shaft 16. After substantially a half rotation of said shaft, however, to cause the plunger 14 to completely compress the bulb, the said shaft will be stopped by the engagement of the lug 114 with the pawl 111. Simultaneously the finger 122 will engage the upturned end of the lever 117, thereby releasing the secondary time controlling mechanism. The bulb will now be held compressed until the expiration of the time indicated on the dial 105, when the end of the lever 108 will enter the notch 107, thereby permitting the shaft 16 to make a further movement until stopped by the pawl 25, thereby withdrawing the plunger and releasing the bulb.

Means have been above described for preventing resetting of the apparatus after a time exposure until the primary time-controlling mechanism has been locked, such means comprising the locking bar 76 for engaging the notch 78 of the resetting rod 47. It is also desirable that means be provided for preventing a rewinding of the spring 15 under the same circumstances. Such means as herein shown are as follows: On the shaft 16, or an extension thereof, is mounted a pinion 123 engaging a gear 124 provided with a locking plate 125 having a locking opening 126. The locking bar 76 is extended beyond the resetting rod 47, and is pivoted at its end to a bell crank lever 128 fulcrumed at 129, and having its opposite end connected by a link 130 guided by a radius arm 131 to a locking bar 132 suitably guided in the frame of the apparatus, and carrying a pin 133 adapted to engage the opening 126 in the plate 125. The opening 126 is so located as to be brought beneath the pin 133 upon the completion of the second actuation of the plunger 14 in making the time exposure. As will now be seen, after the completion of the time exposure the resetting rod 47 will be locked to prevent a resetting of the lever 29 and the gear 124 will be locked to prevent a rewinding of the spring 15 until the shaft 64 has been turned to lock the clockwork of the primary time controlling mechanism.

When the apparatus is operated as above described for producing an instantaneous, an automatic time, or a bulb exposure, the resetting rod 47 will not be elevated to a sufficient extent to cause the projection 77 to enter the notch 78, nor will the opening 126 in the plate 125 be brought to a position beneath the pin 133. A second locking mechanism, operative alternatively with that last described, is therefore provided, and as illustrated is substantially as follows:

The link 50 is provided with a notch 134 adapted to receive a projection 135 formed on a link or locking bar 136 pivoted to one end of a bell crank lever 137, and to a second lever 138, and controlled by a spring 139. The lever 138 has a portion extended into the path of movement of the cam 81 on the shaft 64. The lever 137 is connected at its end opposite to the link 136 by a link 140 guided by a radius arm 141 to a locking bar 142 similar to the locking bar 132, and carrying a pin 143 adapted to enter the opening 126 in the plate 125 after a single reciprocation of the plunger 14. As will now be seen after an operation of the apparatus for producing an exposure other than the ordinary time exposure the projection 135 will enter the notch 134 and the pin 143 will enter the opening 126 thereby effectively locking the apparatus against resetting until the primary time-controlling mechanism has been locked. Upon turning the shaft 64 for the latter purpose a projection formed on the cam 81 will engage the lever 138 and release the locking mechanism last described.

It will therefore be seen that two mechanisms are provided for locking the apparatus against resetting after an operation thereof prior to the locking of the time-controlling mechanism. In order to render these two mechanisms alternatively operative according to the character of exposure for which the apparatus is adjusted, the following means are employed: Mounted on the shaft 93 is a double cam 144 adapted, when the key 94 is in one position, to engage the lever 79 and hold the locking mechanism controlled thereby inoperative, and when said key 94 is in another position to engage the lever 138 and hold the locking mechanism connected therewith inoperative. It will therefore be seen that when the adjusting key 94 is turned to adjust the apparatus for an exposure of a certain kind the proper locking mechanism will be rendered operative and the improper one inoperative.

It will be observed that the range of movement of the plunger actuating mechanism is substantially constant. Inasmuch, however, as the bulbs of camera shutters vary in size and thickness of material, and for the further reasons that it is necessary, first, that the bulb be completely compressed, and, second, that the plunger be allowed a complete reciprocation in order that its actuating mechanism may not be prematurely stopped, it is necessary that some means be provided intermediate the bulb and the plunger actuating mechanism to compensate for the variations above noted. To this end the invention contemplates the provision of a yielding element in the plunger. Said plunger, as shown most clearly in Figs. 4, 7, 11 and 12, comprises two telescoping tubular members 145 and 146 between which is interposed a spring 148. The members 145 and 146 are connected by a bayonet joint consisting of inturned fingers 174 (see Fig. 11) on the member 145 which enter angular slots 147 in the member 146. The form of these slots is most clearly shown in Fig. 12 from which it will be seen that the members 145 and 146 may be moved longitudinally to cause the fingers 174 to enter the longer or open ended longitudinal portions of the slots and relatively rotated to carry said fingers into the circumferential portions thereof. Thereafter the shorter or closed longitudinal portions of said slots 147 will permit a limited telescoping movement of the members 145 and 146 against the pressure of the spring 148. This construction permits the plunger actuating mechanism to complete its full movement irrespective of the size or thickness of the bulb, so that its movement may be made sufficient to cause a complete compression of a bulb of any skin thickness.

In order to prevent an undesirable reciprocating movement of the plunger 14 during the winding of the spring 15, means are herein provided for detachably connecting the telescopic portion of the plunger from its actuating mechanism, such means as herein shown being as follows, reference being had particularly to Figs. 4, 5, 7 and 13.

Suitably guided on rods 149 (see Fig. 7) is a plate 150 (Fig. 4) connected to the crank 17 by a pitman 151. Secured to the plate 150 and guided in the plate 153 (Figs. 4 and 7) is a rod 154 (Figs. 4, 5 and 7) provided at its end with a notch 155. Interposed between a stationary plate 152 (Fig. 7) and plates 156 carried by the plate 150, are springs 157 for assisting the spring 15 during the forward movement of the plunger 14, and for, in part, counterbalancing said spring 15 during the rearward movement of said plunger, substantially for the purpose described in my aforesaid application No. 415,137.

Referring to Figs. 4, 5, 7, 11 and 12, 159 denotes a latch provided at one end with an abutment pin 171 and at the other with a hub 160 loosely mounted on a pin 158 projecting from the end of the plunger member 146. Said latch is normally held with its hub 160 and abutment pin 171 in engagement with the end face of said member 146 by a spring 161 and is further normally held in position to engage the notch 155 in the rod 154, and also to engage notches in pins 162 carried by said plunger member 146 by a spring 163. It will now be seen that the latch 159 provides means for detachably connecting the telescopic portion of the plunger to the rod 154.

For detaching the connecting means last described there is provided a lever 164 having an end 165 adapted to engage the end 166 of the latch 159, and to raise the same out of engagement with the rod 154 and pins 162. The lever 164 is connected by a link 167 with the segment plate 75 on the shaft 64. Said link 167 is provided with a finger 172 adapted to be arrested by a stop pin 173 fastened to the front plate for the purpose of limiting the movement of said link. As will now be seen, when the key 65 is turned to lock the time-controlling mechanism the lever 164 will cause the latch 159 to disconnect the plunger from its actuating mechanism, so that the spring 15 may be rewound without causing a reciprocation of the telescopic portion of the plunger, the rod 154 at this time reciprocating through an opening in the member 146. When the key 65 is turned to release the time-controling mechanism the latch 159 is at once put under the influence of its spring 163 for operatively connecting the plunger and its actuating means.

Secured to the sides of the plunger member 145, in the construction shown, are plates 169 having inclined projecting portions adapted to be engaged by pivoted spring detents 170, thereby providing means for yieldingly maintaining the plunger in its normal position.

Certain features of the mechanism herein shown and described are covered by the claims of my co-pending application Serial No. 564,692, filed June 2, 1910, and no claim is made herein to any subject-matter common to this and my said co-pending application.

Having described my invention I claim and desire to secure by Letters Patent:

1. In an apparatus of the character described, in combination, mechanism for operating the shutter of a photographic camera, a time controlling mechanism therefor comprising a plurality of clockworks, and mechanism for simultaneously positively starting said clockworks.

2. In an apparatus of the character described, in combination, mechanism for operating the shutter of a photographic camera, a time controlling mechanism therefor comprising a plurality of clockworks, mechanism for holding said clockworks inoperative and for releasing the same, and adjusting means for said holding and releasing mechanism for causing the same to release one or a plurality of said clockworks.

3. In an apparatus of the character described, in combination, mechanism for operating the shutter of a photographis camera, a time controlling mechanism therefor comprising a plurality of clockworks, mechanism for starting said clockworks, and adjusting means for said starting mechanism for causing the same to start one or a plurality of said clockworks.

4. In an apparatus of the character described, in combination, mechanism for operating the shutter of a photographic camera, a time-controlling mechanism therefor comprising a plurality of clockworks, means for holding each of said clockworks inoperative, an actuator, gear connections between said actuator and each of said holding means for rendering the latter operative and inoperative, and means for rendering inoperative the gear connection between said actuator and one of said holding means.

5. In an apparatus of the character described, in combination, mechanism for operating the shutter of a photographic camera, a time controlling mechanism therefor comprising a plurality of clockworks, a stop for each of said clockworks for holding the same inoperative, a manually operated key, connections between said key and each of said stops for moving the latter into and out of operative position, a second manually operated key, and means operated by said last-named key, for rendering one of said connections inoperative.

6. In an apparatus of the character described, in combination, mechanism for operating the shutter of a photographic camera, a time controlling mechanism therefor comprising a plurality of clockworks, mechanism for holding said clockworks inoperative and for releasing the same, adjusting means for said holding and releasing mechanism for causing the same to release one or a plurality of said clockworks, and means for locking said adjusting means when one or more of said clockworks is released.

7. In an apparatus of the character described, in combination, mechanism for operating the shutter of a photographic camera, a time controlling mechanism therefor comprising a plurality of clockworks, a stop for each of said clockworks for holding the same inoperative, a manually operated key, connections between said key and each of said stops for moving the latter into and out of operative position, a second manually operated key, means operated by said last-named key for rendering one of said connections inoperative, and means for locking said key when one or more of said stops is out of operative position.

8. In an apparatus of the character described, in combination, mechanism for operating the shutter of a photographic camera, a time controlling mechanism therefor comprising a plurality of clockworks, mechanism for holding said clockworks inoperative and for releasing the same, adjusting means for said holding and releasing mechanism for causing the same to release one or a plurality of said clockworks, said adjusting means having a locking plate provided with a plurality of notches, a lock adapted to engage one of said notches when said adjusting means is in a position to cause a release of one of said clockworks and to engage another of said notches when said adjusting means is in position to cause the release of a plurality of said clockworks, and means operatively connected with said holding and releasing mechanism for operating said lock.

9. In an apparatus of the character described, in combination, mechanism for operating the shutter of a photographic camera, a time controlling mechanism therefor comprising a plurality of clockworks, means other than said time-controlling mechanism for locking said shutter operating mechanism, and mechanism for simultaneously starting both said clockworks and withdrawing said locking means.

10. In a device of the character described, in combination, mechanism for operating the shutter of a photographic camera, a time controlling mechanism therefor, and means other than said time controlling mechanism for locking said shutter operating mechanism after a plurality of operations thereof.

11. In an apparatus of the character described, in combination, mechanism for operating the shutter of a photographic camera, a time controlling mechanism therefor, mechanism for holding said time controlling mechanism inoperative and for releasing the same, means other than said time controlling mechanism for locking said shutter operating mechanism after a plurality of operations thereof, and operative connections between said holding and releasing mechanisms and said locking means.

12. In an apparatus of the character described, in combination, mechanism for operating the shutter of a photographic camera, comprising a shutter operating device and actuating mechanism therefor, a time controlling mechanism for said shutter operating mechanism, and mechanism other than said time controlling mechanism for locking said actuating mechanism in any one of a plurality of positions after one or more actuations of said shutter operating device.

13. In an apparatus of the character described, in combination, mechanism for operating the shutter of a photographic camera, a time controlling mechanism therefor, a plurality of alternatively operative devices for locking said shutter operating mechanism against resetting after the operation thereof, and manually operatable means for rendering said locking devices alternately operative.

14. In an apparatus of the character described, in combination, mechanism for operating the shutter of a photographic camera, comprising a shutter-operating device, and actuating mechanism therefor, a time controlling mechanism for said shutter operating mechanism, a plurality of alternatively operative devices for locking said actuating mechanism against resetting after an operation thereof, and manually operatable means for rendering said locking devices alternately operative.

15. In an apparatus of the character described, in combination, mechanism for operating the shutter of a photographic camera, comprising a shutter operating device, actuating mechanism therefor, and means for restraining said actuating mechanism, a time controlling mechanism for controlling the time of release of said restraining means, means for resetting said restraining means after the operation of said shutter operating mechanism, a plurality of alternatively operative devices for locking said resetting means, and manually operatable means for rendering said locking devices alternatively operative.

16. In an apparatus of the character described, in combination, mechanism for operating the shutter of a photographic camera, a time controlling mechanism therefor, adjusting means for setting said mechanisms to cause said shutter operating mechanism to make one or a plurality of operations, and a plurality of locking devices rendered alternatively operative by said adjusting means, one of said locking devices being constructed and arranged for locking said shutter operating mechanism after a single operation thereof, and the other of said locking devices being constructed and arranged for locking the shutter operating mechanism after a plurality of operations thereof.

17. In an apparatus of the character described, in combination, mechanism for operating the shutter of a photographic camera, a time controlling mechanism therefor comprising a plurality of clockworks, mechanism for holding said clockworks inoperative and for releasing the same, adjusting means for said holding and releasing mechanism for causing the same to release one or a plurality of said clockworks, and a plurality of devices, rendered alternatively operative by said adjusting means, for locking said shutter operating mechanism against resetting after the operation thereof.

18. In an apparatus of the character described, in combination, mechanism for operating the shutter of a photographic camera, a primary time controlling mechanism therefor, a secondary time controlling mechanism therefor, means for locking said shutter operating mechanism against resetting after its operation under the control of said primary time-controlling mechanism, and means for locking the same against resetting after its operation under the control of said secondary time controlling mechanism.

19. In an apparatus of the character described, in combination, time controlling mechanism, mechanism controlled thereby for operating the shutter of a photographic camera, comprising a shutter-operating device, actuating mechanism therefor, and means for restraining said actuating mechanism, a resetting rod, means for operatively connecting said resetting rod and said restraining means, a locking mechanism for said shutter operating mechanism comprising a latch adapted to engage said resetting rod and a latch adapted to engage a moving part of said actuating mechanism, a second locking mechanism comprising a latch adapted to engage said connecting means and a latch adapted to engage said moving part, a manually operated device for rendering said locking mechanisms alternatively operative, and a second manually operated device for releasing said locking mechanisms.

20. In an apparatus of the character described, in combination, time controlling mechanism and shutter operating mechanism for opening a camera shutter at a time determined by said controlling mechanism; said operating mechanism including an actuating spring, an operating member and intermediate force transmitting connections between said actuating spring and said operating member; and a force maintaining mechanism constructed and arranged to maintain said force for a period of time and thereafter to release said operating member.

21. In an apparatus of the character described, in combination, time controlling mechanism, locking mechanism for the time controlling mechanism, and shutter operating mechanism for opening a camera shutter at a time determined by said time controlling mechanism; said operating mechanism including an actuating spring, an operating member and intermediate force transmitting connections between said actuating spring and said operating member; and a force maintaining mechanism constructed and arranged to maintain said force for a period of time and thereafter to release said operating member.

22. In an apparatus of the character described, in combination, time controlling mechanism, shutter operating means controlled by said time controlling mechanism including an actuating spring, an operating member and intermediate force transmitting connections between said actuating spring and said operating member; a restraining device for said shutter operating means constructed and arranged to restrain the same in its initial position and to release the same at a time determined by said time controlling mechanism and to re-restrain the same after an operation thereof discontinuing the force exercised on the camera shutter; and a force maintaining device for restraining said shutter operating member during the exercise of said force on the camera shutter.

23. In an apparatus of the character described, in combination, a primary time controlling mechanism; shutter operating mechanism for opening the camera shutter at a time determined by said time controlling mechanism, said operating mechanism including an actuating spring, an operating member and intermediate force transmitting connections between said actuating spring and said operating member; a force maintaining mechanism constructed and arranged to maintain said force for a period of time and thereafter to release said operating member; and a secondary time controlling mechanism, independent of said primary time controlling mechanism, for controlling said force maintaining mechanism.

24. In an apparatus of the character described, in combination, a primary time controlling mechanism; shutter operating mechanism for opening the camera shutter at a time determined by said time controlling mechanism, said operating mechanism including an actuating spring, an operating member and intermediate force transmitting connections between said actuating spring and said operating member; a force maintaining mechanism constructed and arranged to maintain said force for a period of time and thereafter to release said operating member; a secondary time controlling mechanism, independent of said primary time controlling mechanism, for controlling said force maintaining mechanism; and locking mechanisms for both said time controlling mechanisms.

25. An apparatus for automatically operating a photographic camera comprising, in combination, mechanism for operating the camera shutter, a time controlling mechanism adapted to cause said operating mechanism to produce a time exposure, a separate time controlling mechanism adapted to cause said operating mechanism to produce a bulb exposure, indicators operated by said time controlling mechanisms, and separate scales with which said indicators cooperate, respectively.

26. In an apparatus of the character described, in combination, means for holding the end of a manually operatable flexible power transmitter, means for operating upon said transmitter, a primary clockwork for controlling the time of operation thereof, a secondary clockwork for controlling the time of operation thereof, and means for causing said secondary clockwork to start after the release of said operating means by said primary clockwork.

27. In an apparatus of the character described, in combination a shutter operating device, actuating mechanism therefor, a primary time controlling mechanism adapted to restrain and thereafter release said actuating mechanism to cause the same to actuate said shutter operating device in one direction, a secondary time controlling mechanism adapted to restrain and thereafter release said actuating mechanism to cause the same to actuate said shutter operating device in the opposite direction, and means for causing said secondary time controlling mechanism to start after the release of said actuating mechanism by said primary time controlling mechanism.

28. In an apparatus of the character described, in combination, a plunger, mechanism for actuating said plunger, a clockwork and means controlled thereby for releasing said actuating mechanism, a second clockwork and means controlled thereby for releasing said actuating mechanism, a stop for holding said second clockwork inoperative, and means movable with said plunger and adapted to engage and remove said stop on the release of said plunger by said first named clockwork.

29. In an apparatus of the character described, in combination, time controlling mechanism and shutter operating mechanism controlled thereby comprising means for holding the end of a flexible power transmitter, a plunger, one of said parts having a yielding element, and actuating mechanism for said plunger having a substantially constant range of movement.

30. In an apparatus of the character described, in combination, time controlling mechanism and shutter operating mechanism controlled thereby comprising a plunger having a yielding element and actuating mechanism for said plunger having a substantially constant range of movement.

31. In an apparatus of the character described, in combination, time controlling mechanism and shutter operating mechanism controlled thereby comprising a plunger having a telescopic section, a spring interposed between the members of said section, and actuating mechanism for said plunger.

32. In an apparatus of the character described, in combination, time controlling mechanism and shutter operating mechanism controlled thereby comprising a plunger having a section composed of two telescoping tubular members connected by a bayonet joint, a spring interposed between and inclosed by said members, and actuating mechanism for said plunger.

33. In an apparatus of the character described, in combination, time controlling mechanism and shutter operating mechanism controlled thereby comprising a shutter operating device, actuating mechanism therefor, a notched rod connected with one of said parts, and a latch connected with the other of said parts and adapted to engage the notch in said rod.

34. In an apparatus of the character described, in combination, time controlling mechanism and shutter operating mechanism controlled thereby comprising a shutter operating device, actuating mechanism therefor, a latch for connecting said parts, and a releasing device adapted to engage and release said latch.

35. In an apparatus of the character described, in combination, time controlling mechanism and shutter operating mechanism controlled thereby comprising actuating mechanism, a rod actuated thereby and having a notched end, a plunger having an opening adapted to receive the notched end of said rod, a latch carried by said plunger and adapted to engage the notch in said rod, and means for releasing said latch.

36. In an apparatus of the character described, in combination, mechanism for operating the shutter of a photographic camera including a shutter operating device, actuating mechanism therefor, and means for detachably connecting said shutter operating device, and its actuating mechanism, a time controlling mechanism for said shutter operating mechanism, mechanism for holding said time controlling mechanism inoperative and for releasing the same, and operative connections between said holding and releasing mechanism and said connecting means whereby when said time controlling mechanism is inoperative said connecting means are detached.

37. In an apparatus of the character described, in combination, mechanism for operating the shutter of a photographic camera, including a shutter operating device, actuating mechanism therefor, means for connecting said shutter operating device and its actuating mechanism, and means for detaching said connecting means, a time controlling mechanism for said shutter operating mechanism, mechanism for holding said time controlling mechanism inoperative and for releasing the same, and means operated by said holding and releasing mechanism for operating said detaching means.

38. In an apparatus of the character described, in combination, mechanism for operating the shutter of a photographic camera, including a plunger, actuating mechanism therefor, a latch for connecting said plunger and actuating mechanism, and a releasing device adapted to engage and release said latch, a time controlling mechanism including a clockwork, a stop for holding said clockwork inoperative, means for removing and replacing said stop, and operative connections between said means and said releasing device.

39. In an apparatus of the character described, in combination, means for operating a camera shutter a plurality of times, a plurality of clockworks, means for locking said clockworks, operative connections between said shutter operating means and said clockworks for controlling the times of the several operations of said operating means, said connections being constructed and arranged to cause a discontinuation of the movement of each of said clockworks simultaneously with the respective operation of said shutter operating means controlled thereby and to permit such movement again upon resetting of said connections preparatory to another operation of said device, means for resetting said operative connections, means for locking said connections against resetting, and means for removing said last-named locking means simultaneously with the locking of said clockwork by said first named locking means.

40. In an apparatus of the character described, the combination with means for operating a camera shutter a plurality of times, of means for actuating said compressing means, means for restraining said actuating means, a plurality of clockworks for controlling said restraining means, means for locking said clockworks, means controlled successively by said clockworks for removing said restraining means and for simultaneously causing the discontinuation of the movement of the clockwork last controlling the same, means for resetting the actuating means for the shutter operating means after the operation of the shutter, means for locking said actuating mechanism against resetting, and means for simultaneously removing said last-named locking means and causing said clockworks to be locked by said first named locking means.

41. In an apparatus of the character described, in combination, a shaft, a spring for rotating said shaft, a plunger, means operatively connecting said shaft and plunger for causing the reciprocation of the plunger when said shaft is rotated by said spring, and means for interrupting said connection, thereby permitting the winding of said spring without reciprocating said plunger.

42. In an apparatus of the character described, in combination, mechanism for operating the shutter of a photographic camera, comprising a shutter operating device, actuating mechanism therefor and means for restraining said actuating mechanism; a time controlling mechanism comprising a plurality of clockworks and an element moving with each of said clockworks for successively retaining said restraining means in a plurality of positions, alternatively operatable means other than said time controlling mechanism and said moving elements for holding said restraining means in said plurality of positions, and means for simultaneously removing said last named holding means and placing said shutter operating mechanism under the control of said time controlling mechanism.

43. In an apparatus of the character described, in combination, a clockwork, means for locking said clockwork and manually operatable means for releasing the same, shutter operating means constructed and arranged for transmitting a force to the camera shutter for opening the same at a time determined by said clockwork, force maintaining means coöperating with said shutter operating means for maintaining said force during a period of time, a secondary time controlling means for controlling the duration of this period of time and manually operatable means for adjusting this time controlling means to vary the duration of said period of time.

44. In an apparatus of the character described, in combination, a clockwork, means for locking said clockwork and manually operatable means for releasing the same, shutter operating means constructed and arranged for transmitting a force to the camera shutter for opening the same at a time determined by said clockwork, force maintaining means coöperating with said shutter operating means for maintaining said force during a period of time, a secondary time controlling means for controlling the duration of this period of time, a dial, an indicator and manually operatable means for simultaneously adjusting said force maintaining means and setting said indicator.

45. In an apparatus of the character described, in combination, a clockwork, means for locking said clockwork and manually operatable means for releasing the same, shutter operating means constructed and arranged for transmitting a force to the camera shutter for opening the same at a time determined by said clockwork and simultaneously causing the discontinuation of the movement of said clockwork, and a force maintaining means coöperating with said shutter operating means for maintaining said force during a period of time.

46. In an apparatus of the character described, in combination, a clockwork, means for locking said clockwork and manually operatable means for releasing the same, shutter operating means constructed and arranged for transmitting a force to the camera shutter for opening the same at a time determined by said clockwork and simultaneously causing the discontinuation of the movement of said clockwork, force maintaining means coöperating with said shutter operating means for maintaining said force during a period of time, a secondary time controlling means for controlling the duration of this period of time and manually operatable means for adjusting this time controlling means to vary the duration of said period of time.

47. In an apparatus of the character described, in combination, a clockwork, means for locking said clockwork and manually operatable means for releasing the same, shutter operating means constructed and arranged for transmitting a force to the camera shutter for opening the same at a time determined by said clockwork and simultaneously causing the discontinuation of the movement of said clockwork, force maintaining means coöperating with said shutter operating means for maintaining said force during a period of time, a dial, an indicator and manually operatable means for simultaneously adjusting said force maintaining means and setting said indicator.

48. In an apparatus of the character described, in combination, a clockwork, means for locking said clockwork and manually operatable means for releasing the same, shutter operating means constructed and arranged for transmitting a force to the camera shutter for opening the same at a time determined by said clockwork, a secondary clockwork, force maintaining means coöperating with said shutter operating means for maintaining the force exercised by the same for a period of time and for discontinuing the same at a time determined by said secondary clockwork, and operative connections between said force maintaining means and said secondary clockwork constructed and arranged to cause the discontinuation of the movement of said secondary clockwork simultaneously with the discontinuation of said force.

In testimony whereof I affix my signature, in presence of two witnesses.

ARTHUR LATTAU.

Witnesses:
JOHN L. ROGERS,
ROBT. C. HARDING.